United States Patent [19]

Blum et al.

[11] Patent Number: 4,507,456

[45] Date of Patent: Mar. 26, 1985

[54] HEAT-SETTING MIXTURES OF A POLYISOCYANATE WITH A POLYOL WHICH HAVE A LONG SHELF LIFE, AND THEIR PREPARATION

[75] Inventors: Rainer Blum, Ludwigshafen; Herbert Spoor, Limburgerhof; Gerhard Holtmann, Muenster; Rolf Osterloh, Gruenstadt, all of Fed. Rep. of Germany

[73] Assignee: BASF Aktiengesellschaft, Fed. Rep. of Germany

[21] Appl. No.: 581,905

[22] Filed: Feb. 21, 1984

Related U.S. Application Data

[63] Continuation of Ser. No. 518,001, Jul. 28, 1983, abandoned.

[30] Foreign Application Priority Data

Jul. 31, 1982 [DE] Fed. Rep. of Germany ....... 3228670
Jul. 31, 1982 [DE] Fed. Rep. of Germany ....... 3228724

[51] Int. Cl.³ .................... C08G 18/80; C08G 18/32; C08G 18/34
[52] U.S. Cl. ........................ 528/45; 528/44; 528/60; 528/902; 528/73
[58] Field of Search ............ 528/45, 902, 73, 60, 528/44

[56] References Cited

U.S. PATENT DOCUMENTS

| | | | |
|---|---|---|---|
| 3,457,200 | 10/1969 | Kallert et al. | 117/94 |
| 3,655,627 | 4/1972 | Hutzler et al. | 528/902 |
| 4,029,626 | 6/1977 | Gillemot et al. | 260/31.6 |
| 4,068,086 | 1/1978 | Dalibor | 560/169 |
| 4,070,346 | 1/1978 | Schnoering et al. | 528/902 |
| 4,251,427 | 2/1981 | Recker et al. | 524/789 |
| 4,400,497 | 8/1983 | Blum et al. | 528/45 |

FOREIGN PATENT DOCUMENTS

| | | |
|---|---|---|
| 1570548 | 1/1968 | Fed. Rep. of Germany . |
| 2612638 | 10/1976 | Fed. Rep. of Germany . |
| 2639491 | 2/1978 | Fed. Rep. of Germany . |
| 2640295 | 3/1978 | Fed. Rep. of Germany . |
| 2842805 | 4/1980 | Fed. Rep. of Germany . |
| 3112054 | 3/1981 | Fed. Rep. of Germany . |
| 1237936 | 6/1960 | France . |

OTHER PUBLICATIONS

Vieweg/Hoechtlen, Polyurethane (Carl Hanser Verlag, Munich) 1966, pp. 11 et seq.
Hartmann et al., Org. Coatings & Appl. Polymer Sci., vol. 46, 1982, pp. 429–432.
Weinmann, Beschichtungen mit Lacken und Kunststoffen (Verlag Colom. Stuttgart) 1967, pp. 103 et seq.

*Primary Examiner*—Herbert S. Cockeram
*Attorney, Agent, or Firm*—Keil & Weinkauf

[57] ABSTRACT

In heat-setting mixtures of a polyisocyanate with a polyol which have a long shelf life at room temperature, the polyisocyanate is present, in the form of discrete particles, in the polyol, and the polyisocyanate particles are deactivated at their surface. From 0.01 to 0.499 equivalent percent of the total amount of isocyanate groups present is deactivated by a primary or secondary amine or water, or from 0.01 to 20 equivalent percent of the said isocyanate groups is deactivated with a compound containing carboxyl, phenolic hydroxyl, amide or hydrazide groups.

These mixtures are useful as coating compositions, adhesives and sealant materials, particularly as undersealants for motor vehicles.

4 Claims, No Drawings

HEAT-SETTING MIXTURES OF A POLYISOCYANATE WITH A POLYOL WHICH HAVE A LONG SHELF LIFE, AND THEIR PREPARATION

This is a continuation of application Ser. No. 518,001 filed July 28, 1983, now abandoned.

The present invention relates to heat-setting mixtures of a polyisocyanate with a polyol which have a long shelf life at room temperature, the polyisocyanate, in the form of discrete particles which are deactivated at their surface, being dispersed in the polyol, and to a process for their preparation.

The preparation of combinations of polyisocyanates with binders which contain groups which are reactive toward isocyanate groups, and their direct application, are known.

However, considerable difficulties result from the fact that the isocyanate group reacts with the envisaged reactant, e.g. a polyol or a polyamine, at as low as room temperature, i.e. it is impossible to formulate a combination having a long shelf life.

In order to overcome this difficulty, two-component systems are frequently used. The reactants are stored in separate formulations, which are mixed only just before application; the reaction then takes place spontaneously or is accelerated by heat and/or a catalyst.

For example, such a material is described in U.S. Pat. No. 4,029,626. The disadvantages of this process are the necessity for separate formulation and storage of the two components, the difficulties in precise metering and thorough mixing before application, and the danger of blockage of the mixing apparatus and applicatior as a result of premature reaction.

Another conventional method of preparing polyisocyanate materials having a long shelf life starts from non-crosslinked prepolymers which contain only a small amount of free isocyanate, atmospheric moisture serving as the crosslinking agent. This method is described in, for example, French Pat. No. 1,237,936. The disadvantage in this case is that the hardening, which begins at the surface, extends only very slowly to the deeper regions of the coating, so that the final properties are acquired only after weeks or months and, for example between large areas or in cavities, no hardening at all occurs.

Stable systems can also be formulated if the polyisocyanate is first reacted with a monofunctional reactant. The resulting adduct is referred to as a blocked isocyanate if it is less heat-stable than the product of the crosslinking reaction to be carried out subsequently. Under the action of heat, the blocking agent is eliminated, and the polyisocyanate undergoes crosslinking, forming more heat-stable bonds.

This principle is described in, for example, ViewegHöchtlen, Kunststoff-Handbuch, Volume VII, Polyurethane (Carl Hanser Verlag Munich, 1966), page 11 et seq, and also forms the basis of a number of patents, e.g. German Published Applications DAS No. 2,640,295, DAS No. 2,612,638 and DAS No. 2,639,491 nd EPA No. 0,000,060.

Because of the eliminated blocking agent, such formulations have technical and economic disadvantages: if the blocking agent remains in the crosslinked material, it changes the properties of the latter; if it vaporizes, it has either to be recovered or to be removed from the waste air.

German Published Application DAS No. 1,570,548 and German Laid-Open Applications DOS No. 2,842,805 and DOS No. 2,921,162 describe polyisocyanates which melt at above 100° C. and at above 130° C. respectively and which, with special polyols, give combinations which have long shelf lives and which can be hardened by heating to give coatings for fabrics or woven hoses.

The industrial disadvantage of the combinations described in these publications is that products having a long shelf life can be obtained only with a very small number of polyols having a special composition; therefore, these combinations are, for example, completely unsuitable for a number of uses.

German Patent Application No. P 31 12 054.7 proposes deactivating the surface of the polyisocyanate particles in a mixture of a polyisocyanate and a polyol so that from 0.5 to 20 equivalent percent of the total amount of isocyanate groups present are deactivated.

It is an object of the present invention to provide liquid or pasty heat-setting mixtures of a polyisocyanate and a polyol which have a long shelf life and do not possess the above disadvantages and whose polyisocyanate particles are deactivated at their surface, if appropriate, to an even smaller extent.

We have found that this object is achieved by heatsetting mixtures which have a long shelf life at room temperature, comprising a polyisocyanate and a polyol, which may or may not contain additives, such as protective colloids, inert solvents, plasticizers, pigments, fillers, dyes or other assistants conventionally used in surface coating technology, wherein the polyisocyanate, in the form of discrete particles having a diameter of from 0.1 to 150 μm, is dispersed in the polyol, which may or may not contain the stated additives, and the polyisocyanate particles are deactivated at their surface, with the proviso that either from 0.01 to 0.499 equivalent percent of the total amount of isocyanate groups present are deactivated by a primary or secondary amine or water, or from 0.01 to 20 equivalent percent of the said isocyanate groups are deactivated by the addition of a compound containing carboxyl, phenolic hydroxyl, amide or hydrazide groups.

The present invention furthermore relates to a process for the preparation of these mixtures, wherein the polyisocyanate is dispersd in the polyol, and either the deactivator is already present in the polyol or some or all of it is subsequently added to the dispersion of the polyisocyanate in the polyol, or the polyisocyanate is first treated with the deactivator, preferably at below 40° C., and then dispersed in the polyol, and the deactivating reaction can, if required, be accelerated by the presence of a suitable selective catalyst.

To accelerate and control the dectivation, a suitable catalyst which preferably selectively promotes the deactivation may also be present.

The present invention furthermore relates to the use of the novel mixtures as coating compositions, adhesives and sealant materials on metals and non-metals, and in particular as undersealants and sound-insulating compositions for motor vehicles and as sealants for heat-insulating and sound-insulating multiple-glazed windows.

The present invention avoids the disadvantages of the prior art described above, in that the polyisocyanate is dispersed, in the form of discrete particles, in the polyol, and the dispersed particles are deactivated at their surface by chemical reactions. Only a very small proportion of the isocyanate groups are deactivated, so that the particles remain reactive.

During heat-setting, phase separation is inhibited by dissolving or melting processes, and crosslinking can take place.

Regarding the components of the novel mixtures, the following may be stated specifically:

Suitable polyisocyanates are the conventional aliphatic, cycloaliphatic and aromatic diisocyanates and polyisocyanates, as obtained, for example, by an addition reaction of a diisocyanate with a diol, triol or polyol, or from a diisocyanate by dimerization to a urethdione, trimerization to an isocyanurate or reaction with an amine or water to give a biuret. Examples of diisocyanates suitable for this purpose include diphenylmethane diisocyanate, toluylene diisocyanate, isophorone diisocyanate and hexamethylene diisocyanate.

Preferred polyisocyanates are those which are solid at room temperature, for example the adduct obtained from toluylene diisocyanate and trimethylolpropane, or the cyanurate obtained from 3 moles of toluylene diisocyanate, and in particular sparingly soluble pulverulent dimeric toluylene diisocyanate containing urethdione groups.

Suitable polyols are the polyesterols, polyetherols and hydroxyl-containing polymers conventionally used in polyurethane chemistry, for example copolymers of olefinically unsaturated monomers without active hydrogen atoms and olefinically unsaturated monomers possessing active hydrogen atoms.

Examples of suitable monomers possessing non-reactive hydrogen atoms are vinyl-aromatics, e.g. styrene or vinyl-toluene, olefins, e.g. ethylene or propylene, acrylates or methacrylates, e.g. butyl acrylate, 2-ethylhexyl acrylate or methyl methacrylate, vinyl esters of straight-chain or branched carboxylic acids, e.g. vinyl acetate, vinyl propionate or vinyl pivalate, and vinyl ethers, e.g. vinyl isobutyl ether.

Examples of suitable monomers possessing hydrogen atoms which are reactive toward isocyanate groups are monoacrylates and monomethacrylates of polyhydric, in particular dihydric, alcohols, e.g. butanediol monoacrylate, hydroxypropyl acrylate or hydroxypropyl methacrylate, other copolymerizable olefinically unsaturated hydroxyl-containing compounds, e.g. vinylglycol, and copolymerizable olefinically unsaturated compounds containing amine and/or amide groups, e.g. acrylamide and methacrylamide.

In the novel mixtures, the polyisocyanate, in the form of discrete particles having a diameter of from 0.1 to 150, preferably from 1 to 50 $\mu$m, is dispersed in the polyol, and the ratio of isocyanate groups to hydroxyl goups is in general from 0.5:1 to 1:05, preferably from 0.9:1 to 1:0.9.

However, the invention is not restricted to these amounts; for example, for certain purposes, e.g. removable metal labels, mixtures containing substantially smaller amounts of isocyanate are also useful.

The dispersed polyisocyanate particles are deactivated at their surface to such an extent that they do not react with the polyol at room temperature.

Advantageously, the deactivator chosen is bound to the surface of the polyisocyanate particles by means of chemical or physical forces, resulting in phase separation between the polyisocyanate particles and the polyol.

To effect chemical deactivation, from 0.01 to 0.499, preferably from 0.1 to 0.4, equivalent percent of the total amount of isocyanate groups present is reacted with a primary or secondary amine or water as a deactivator, or from 0.01 to 20, preferably from 1 to 10, equivalent percent of the said isocyanate groups are reacted with a compound which contains carboxyl, phenolic hydroxyl, amide or hydrazide groups.

To do this, the deactivator can be added to the mixture in the claimed ratio of equivalents. Another suitable method is one in which the deactivator is added in an amount in excess of that corresponding to the claimed ratio of equivalents.

When the surface of the disperse phase has been coated with the deactivator, the deactivation reaction ceases.

Suitable deactivators are water, mono- and polyamines and mono- and poly-alcohols. Particularly suitable deactivators are relatively long-chain monoamines, e.g. stearylamine, which react to give a type of grafted emulsifier. Relatively high molecular weight polyamines, e.g. polyamideamines, and hydroxyl-terminated polymers, e.g. hydroxyl-terminated polybutadience oils, react to form grafted protective colloids. Other particularly suitable reactions for deactivating the isocyanate groups at the surface of the polyisocyanate particles, i.e. for stabilizing the isocyanate/polyol dispersions, are reactions which lead to urea or polyurea structures on the isocyanates, since these structures are insoluble in most polyols and organic solvents. Such urea-forming or polyurea-forming reagents are water and primary or secondary amines, short-chain diamines, e.g. ethylenediamine or propylenediamine, being preferred. The polyureas formed from these short-chain diamines are more organophobic than those obtained from relatively long-chain diamines and hence have a better stabilizing effect. A preferred procedure employs sparingly soluble pulverulent dimeric toluylene diisocyanate. An isocyanate reacts substantially more rapidly with a primary amine than with a polyol, and a mixture having a long shelf life can therefore be obtained directly by stirring pulverulent dimeric toluylene diisocyanate into, for example, an amine-containing polyetherol.

An advantage of this process is that the urea structures react further with other isocyanates at elevated termperatures to form biuret structures, i.e. the deactivator is incorporated into the crosslinked system and does not leave any inhomogeneity.

Other suitable deactivators are carboxyl-containing compounds, e.g. homopolymers and copolymers of acrylic acid, methacrylic acid, maleic acid and other polymerizable acids, acidic polycondensates, e.g. polyesters prepared using an excess of acid, and acidic polymers obtained by alcoholysis of the adducts of maleic anhydride with unsaturated polymers, e.g. linseed oil or polybutadiene oil; compounds containing phenolic hydroxyl groups, e.g. phenol, cresol, cardanol, p-tert.-butylphenol, 2,2-bis-[4-hydroxyphenyl]-propane and the non-crosslinked condensates of these phenolic compounds with aldehydes, e.g. formaldehyde, which are also referred to as resols; amide-containing compounds, e.g. soluble nylons and polymers of acrylamide and methacrylamide or copolymers of acrylamide and/or methacrylamide with acrylates and/or methacrylates; and polyhydrazides which are obtained by hydrazinolysis of polyacrylates and whose preparation is described, for example, by M. Hartmann, R. Dowbenko and U. T. Hockswender in Organic Coatings+Applied Polymer Science 46 (1982), pages 429 and 432.

The stated deactivators have molecular weights of in general from 200 to 1,000,000, in particular from 500 to 5,000.

Particularly suitable compounds for deactivating isocyanate groups at the surface of the polyisocyanate particles, i.e. for stabilizing the isocyanate/polyol dispersions, are polyacrylic acid, polymethacrylic acid and copolymers of these acids with one another or with their esters, or mixtures of their esters with polyacrylatehydrazides.

Advantages of these deactivators include, for example, better adhesion of the hardened products on steel sheet and electrocoated steel sheet.

If required, mixtures of the above deactivators with water and primary or secondary amines and polyamines can also be used.

In a particular embodiment, the mixtures may additionally contain from 0.5 to 60% of conventional plasticizers, such as esters of phthalic acid, adipic acid, sebacic acid or phosphoric cid, high-boiling hydrocarbons, chlorohydrocarbons, epoxidized natural oils or low molecular weight polyesters.

The term plasticizer is discussed in detail by D. Weinmann in Beschichtungen mit Lacken und Kunststoffen, Verlag W. A. Columb, Stuttgart, 1967, page 103 et seq.

For adjustment to special processing conditions or to achieve particular effects, the novel mixture can contain, in general in the polyol, additives such as protective colloids, for example in an amount of from 0.1 to 15%, inert or, if appropriate, reactive solvents, e.g. gasolines, esters, ethers or glycol-ethers, pigments, e.g. carbon black, titanium dioxide and organic or inorganic colored pigments, fillers, e.g. talc, alumina, chalk or quartz flour, dyes or other assistants conventionally used in surface coating technology.

The novel mixtures are generally prepared using conventional dispersing and mixing units. The polyisocyanate is advantageously dispersed in the polyol at below 40° C., preferably at from 0° to 25° C., and either the polyol already contains the total amount of deactivator or the latter is added to the mixture shortly after the dispersing process.

In order to control and to accelerate the deactivation process, it is also possible to add a catalyst. Preferred catalysts are those which selectively accelerate the deactivation. However, the deactivation catalyst can be identical to the catalyst which at a later stage accelerates or controls the specified heat-activated reaction.

In another possible process for preparing the novel mixtures, the polyisocyanate is first treated with the deactivator, preferably at below 40° C., and then dispersed in the polyol.

The novel mixtures have a shelf life of not less than 2 months at 25° C., and no loss of reactivity or irreversible change in the material which has an adverse affect on its use according to specified conditions is observed. Any increase in viscosity which occurs can be eliminated simply by stirring.

The mixtures according to the invention are generally hardened at from 70° to 180° C.

The novel mixtures can be used in liquid or pasty form, and are suitable as coating compositions, adhesives and sealant materials. Suitable substrates are metals, e.g. steel, aluminum, copper or magnesium, which may also be coated with a primer, and non-metals, e.g. glass, ceramics, heat-resistant plastics and textiles.

The mixtures according to the invention can be particularly advantageously used as primers or as undersealants for motor vehicles.

Other uses and advantages include, for example, the better adhesion to glass, which makes it possible to use the product as a sealant and binding agent in the construction of multiple-glazed windows.

In the Examples which follow, parts and percentages are by weight, unless stated otherwise.

COMPARISON EXAMPLE 1

90 parts of a polyetherdiol based on propylene oxide and having a molecular weight of about 450, 140 parts of a polyethertriol based on glycerol and propylene oxide and having a molecular weight of about 420, 45 parts of $TiO_2$ (rutile), 47.5 parts of powdered chalk and 2.5 parts of iron oxide black are dispersed in a cooled dissolver at about 30°–35° C., the mixture is cooled to 20° C. and finely powdered toluylene 2,4-diisocyanate dimerized via urethdione bonds is introduced into the mixture and dispersed at about 20°–25° C. 1 part of a 33% strength solution of diazabicyclooctane in butylglycol and 114 parts of xylene are added to the stirred mixture. The resulting surface coating can be processed with a conventional spraygun and, if it is sprayed onto steel sheets and heated for 20 minutes at 140° C., gives a gray surface coating.

After storage for 3 days at room temperature (about 20°–25° C.), the first coating composition can no longer be stirred but has solidified to a crumb-like material.

EXAMPLE 1

The procedure described in Comparative Example 1 is followed, except that, before the pigments are added, 2.8 parts of polyamidoamine resin having an amine number of about 200 and a viscosity of 52 mPa.s are stirred into the polyol mixture at 25° C.

The resulting surface coating material is processed as described in Comparative Example 1.

After storage for 2 months, any pigment sedimentation which may occur can be eliminated simply by stirring. The surface coating films obtained from the surface coating composition which has been stored and then stirred exhibit the same properties as the surface coating obtained using the freshly prepared composition.

EXAMPLE 2

The procedure described in Example 1 is followed, except that the polyamidoamine resin is stirred in 10 minutes after the finely powdered urethdione of toluylene 2,4-diisocyanate has been dispersed.

The resulting surface coating has the same shelf life as that of Example 1.

COMPARATIVE EXAMPLE 2

140 parts of a polyethertriol based on glycerol and propylene oxide and having a molecular weight of about 420, 300 parts of a polyetherdiol based on propylene oxide and having a molecular weight of about 1,000, 50 parts of powdered chalk, 10 parts of $TiO_2$ (anatase) and 5 parts of iron oxide yellow are dispersed in a cooled dissolver at from 30° to 35° C. The mixture is cooled to 20° C., 136 parts of finely powdered toluylene 2,4-diisocyanate dimerized via the urethdione bond are dispersed in the mixture, and 3 parts of a 33% strength solution of diazabicyclooctane in butylglycol are stirred in. The resulting material can be applied under a pressure of about 200 bar to the underside of automotive bodies using a one-component high-pressure atomizing unit. Heating for 20 minutes at 140° C. gives a fine-foamed flexible coating which provides effective protection against corrosion and impact by stones. There must be no more than about 6 hours between preparation and processing of the material, since after this period the viscosity increases rapidly. After about 2 days, the material in the storage containers has solidified and can no longer be stirred.

EXAMPLE 3

The procedure described in Comparative Example 2 is followed, except that, after the finely divided dimeric toluylene 2,4-diisocyanate has been dispersed, 2.2 parts of the polyamidoamine resin mentioned in Example 1 are dispersed in the mixture. The resulting material can be used as an undersealant for motor vehicles, as described in Comparative Example 2, and its shelf life is not less than 6 months at room temperature.

COMPARATIVE EXAMPLE 3

160 parts of a polyetherdiol based on propylene oxide and having an equivalent weight of about 1,000, an OH number of about 56 and a viscosity of about 320 mpa.s, 70 parts of a polyethertriol based on glycerol and propylene oxide and having an equivalent weight of about 140, an OH number of about 400 and a viscosity of about 365 mpa.s and 63 parts of toluylene 2,4-diisocyanate dimerized via the urethdione bond are dispersed in a high-speed dissolver to give a paste which exhibits good flow. During dispersing, the temperature increase is restricted to a maximum of 25° C. by cooling.

EXAMPLE 4

A paste is prepared by a procedure similar to that described in Comparative Example ·3. Before the dimeric toluylene diisocyanate is dispersed, however, 2.5 parts of a polymer dispersion are dissolved in the polyetherol mixture. The polymer component of this dispersion consists of a copolymer of 50 parts of butyl acrylate, 25 parts of acrylic acid and 25 parts of methacrylic acid. The polymer dispersion is prepared by a conventional emulsion-polymerization method. The emulsion polymerization method is also described in detail in, for example, B. Vollmert: Grundriß der makromolekularen Chemie, Springer-Verlag, Heidelberg, 1962, page 98 et seq.

After the dimeric toluylene 2,4-diisocyanate has been dispersed, 1.5 parts of a 25% strength solution of phenyl mercury propionate in butylglycol are also stirred in.

Testing the mixtures obtained in accordance with Comparative Example 3 and in accordance with Example 4 according to the invention:

A paste as described in Comparative Example 3 is catalyzed with 0.5% of a 25% strength solution of phenyl mercury propionate in butylglycol, and the resulting material is applied as a layer about 1 mm thick onto the zinc-phosphatized steel sheet by means of a knife coater; the procedure is repeated with the novel paste of Example 4. Both samples are heated for 20 minutes at 140° C. and then cooled, clear, slightly foamed flexible coatings being obtained.

The coating produced from the novel paste which is partly deactivated and hence stabilized by means of a carboxyl-terminated polymer (Example 4) shows good adhesion to the substrate.

The coating obtained from the paste prepared as described in Comparative Example 3 can be completely detached from the steel sheet by gentle pulling.

We claim:

1. A heat-setting mixture which has a long shelf life at room temperature, comprising a polyisocyanate and a polyol which may or may not contain additives, such as protective colloids, inert solvents, plasticizers, pigments, fillers, dyes or other assistants conventionally used in surface coating technology, wherein the polyisocyanate, in the form of discrete particles having a diameter of from 0.1 to 150 μm, is dispersed in the polyol, which may or may not contain the stated additives, and the polyisocyanate particles are deactivated at their surface, with the proviso that from 0.01 to 20 equivalent percent of the total amount of isocyanate groups present are deactivated by the addition of a compound containing carboxyl, phenolic hydroxyl, amide or hydrazide groups.

2. The mixture of claim 1, wherein, after the surface of the polyisocyanate particles has been deactivated, the ratio of the reactive NCO groups present in the mixture to the hydroxyl groups of the polyol is from 1:0.5 to 0.5:1.

3. A process for preparing a heat-setting mixture having a long shelf life at room temperature, said mixture comprising a polyisocyanate dispersed in a polyol, wherein a compound containing carboxyl, phenolic hydroxyl, amide or hydrazide groups is added to the polyol and/or to the dispersion to deactivate from 0.01 to 20 equivalent percent of the total amount of isocyanate groups that are present.

4. A process for preparing a heat-setting mixture having a long shelf life at room temperature, said mixture comprising a polyisocyanate dispersed in a polyol, wherein a compound containing carboxyl, phenolic hydroxyl, amide or hydrazide groups is added to the polyisocyanate before the dispersion is formed to deactive from 0.01 to 20 equivalent percent of the total amount of isocyanate groups that are present.

* * * * *